Nov. 28, 1961 M. CANEPA 3,010,653
DIGITAL INPUT MECHANISM FOR COMPUTING MACHINES
Filed Nov. 2, 1959
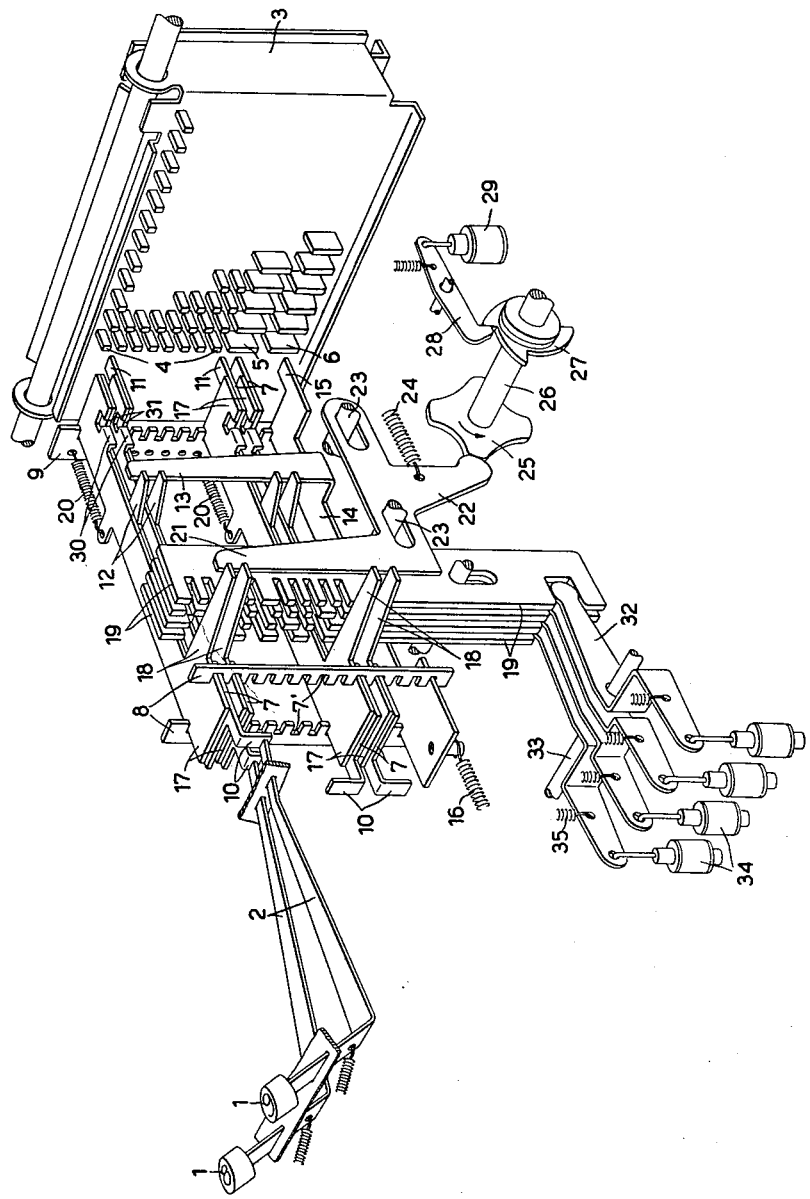
INVENTOR
MICHELE CANEPA
BY
ATTORNEYS 3,010,653
DIGITAL INPUT MECHANISM FOR
COMPUTING MACHINES
Michele Canepa, South Norwalk, Conn., assignor to Ing.
C. Olivetti & C., S.p.A., Ivrea, Italy, a corporation of
Italy
Filed Nov. 2, 1959, Ser. No. 850,463
1 Claim. (Cl. 235—146)

This invention relates to computing machines and, more particularly, to automatically controlled digital input mechanisms for said machines, such as record controlled input mechanisms.

Electromagnetically controlled input mechanisms are known, wherein each key or setting member normally operated thereby may also be operated by a corresponding electromagnet, such mechanisms thus requiring at least ten electromagnets. Furthermore, if the decimal digits to be set are coded, for example according to binary code, said mechanisms require a decoding device.

The primary object of the present invention is to provide a digital input mechanism for computing machines which obviates these disadvantages.

A more specific object is to provide a digital input mechanism controlled by the binary digits read out from a coder controlled in turn by a measuring apparatus such as a weighing scale.

Another object is to provide a digital input mechanism adapted to set a multidenominational weight read out from a weighing scale upon weighing a merchandise to be sold, to enable the computing mechine to effect multiplication of said weight and a preset price in order to calculate the amount thereof.

According to the invention, in a digital input mechanism for computing machines, I now provide a set of elements individually settable for representing a digit, a set of manually operated members for setting said elements, a plurality of code bars for additionally operating said setting members, and means for variably setting said code bars.

Further objects, features and advantages of the invention will become apparent from the following detailed description of a preferred embodiment thereof, taken in conjunction with the accompanying drawings showing a partial perspective view of an input mechanism according to the invention embodied in a ten key computing machine.

With reference to the drawings, the input mechanism comprises a set of digits keys 1 each one secured to a push rod 2, and a conventional multidenominational indexing mechanism formed of a pin carriage 3 transversely movable step by step under the control of an escapement device not shown in the drawings. The pin carriage 3 is provided in each denomination with a set of elements individually settable for representing a digit, said set of elements comprising eight rearwardly settable stop pins 4 for representing the digits one to eight, and a rearwardly settable stop pin 5 for representing the digit zero. For the digit nine, there is provided a fixed stop not shown in the drawings. The pin carriage 3 is further provided in each denomination with a settable stop pin 6 adapted to control the operation of the escapement device.

The input mechanism further comprises a set of setting members each one operated by a corresponding key 1 for setting said elements. More particularly, each one of said setting members is formed of a slide 7 slidably mounted in a pair of juxtaposed notches 7' of a comb plate 8 and in a corresponding notch of a comb plate 9. Each slide 7 is formed with a forward bent lug 10 engaged by the push rod 2 of the corresponding key 1 and with a rearward projection 11 adapted to set the corresponding stop pin 4 or 5. The slide 7 corresponding to the digit nine is deprived of said rearward projection 11 because of the fixed stop. Finally, each slide 7 is formed with a lateral projection 12 contacting a universal bail formed of a bent lug 13 of a horizontal slide 14 urged leftwards by a spring 16. A rearward projection 15 of the slide 14 is adapted to set the escapement stop pin 6.

Associated with the set of setting members 7 is a set of intermediate members selectable for additionally operating said setting members. More particularly, each intermediate member is formed of a slide 17 slidably mounted together with the associated slide 7 in the notches of the comb plates 8 and 9. Each slide 17 is formed with a lateral arm 18 adapted to cooperate with the notched edge of a plurality of reciprocable notched code bars 19 settable for selecting said intermediate members, an individual spring 20 stronger than the spring 16 and urging each intermediate member rearwards. The arms 18 are normally held out of contact with the code bar 19 by a cyclically operable means comprising a vertical arm 21 of a slide 22 slidably mounted on a pair of stationary pins 23 and urged by a spring 24 to cooperate with a cam 25 secured to a shaft 26. The latter is adapted to be driven by an electric motor, not shown in the drawings, through a one fourth revolution clutch 27 normally locked by a latch 28 controlled by an electromagnet 29. Upon energizing the electromagnet 29 the clutch 27 is released to enable the shaft 26 to be driven through 90 degrees.

At last, each intermediate member 17 is yieldably connected to the associated setting member 7. More particularly, each slide 17 is provided with a bent lug 30 cooperating with a shoulder 31 of the associated slide 7 urged leftwards by the common spring 16.

The code bars 19 are connected to a plurality of levers 32 fulcrumed on a common shaft 33 and controlled by suitable means, such as a plurality of electromagnets 34, for variably setting said code bars. Upon energizing one of said electromagnets 34 the corresponding code bar 19 is set in its upper position against the urge of a spring 35.

The input mechanism may be operated either manually or automatically.

If a digit key is manually depressed, the push rod 2 engaging the lug 10 shifts the corresponding slide 7 rearwardly. The projection 11 thereof will thus set the corresponding stop pin 4 or 5, while the projection 12 moves the slide 14 rearwardly against the urge of the spring 16, whereby the projection 15 of the slide 14 will set the escapement stop pin 6.

Upon releasing the key 1 the spring 16 will restore the slide 14 and thus the shifted slide 7. The pin carriage 3 will now be shifted one step leftwards to bring the stop pins 4, 5 and 6 of the next following denomination in front of the projections 11 and 15.

During the manual operation of the setting member 7 the shaft 26 is not driven, whereby the intermediate members 17 remain at rest.

It will now be assumed that a pluse combination representing a decimal digit according to the binary code is sent to the plurality of electromagnets 34 and that a start pulse is sent to the electromagnet 29. A corresponding combination of electromagnets 34 will be energized thus setting the core bars 19. A single row of notches of the code bars 19 will be aligned in front of the arm 18 of the slide 17 corresponding to the digit represented by said pulse combination. Thereupon the electromagnet 29 is energized by a start pulse and the clutch 27 will be released.

At the beginning of the ensuing one fourth revolution of the shaft 26 the cam 25 enables the slide 22 to be moved rearwardly by its spring 24, thus releasing the arms 18 of the slides 17 urged rearwardly by their springs 20. The arms 18 facing the single row of aligned notches of the code bars may now enter said notches, whereby the corresponding slide 17 is shifted rearwards by its spring 20 to operate, by means of the lug 30, the associated slide 7, while the remaining arms 18 are arrested by the code bars 19.

Thereupon the cam 25 restores the slide 22 which in turn restores the shifted slide 17 and removes the remaining projections 18 from the code bars 19. The code bars 19 may now be restored to their lower position by their springs 35. It will thus be clear that the intermediate members 17 are selected by the code bars to additionally operate the associated setting members 7, and that the keys 1 are unaffected by said operations.

Since the code bars may be sequentially set four times during one revolution of the shaft 26 thus setting up four denominations, the shaft 26 will be cycled until all the denominations of an amount to be set in the input mechanism has been processed.

It should be understood that the structure disclosed is only illustrative and the invention can be carried out by other means. Also, while it is designed to use the various features and elements in the combinations and relations described, some of these may be altered and modified without interfering with the more general results outlined.

For example, the clutch 27 may be released by a single start pulse at the beginning of a multidenominational input operation and may be relatched at the end of said operation, timing means being provided for timing the movement of the shaft 26 with the operation of the device sending the pulse combinations. Furthermore, a locking device may be provided to prevent the keys 1 from being operated during the operation of the shaft 26.

What I claim is:

In a computing machine having a multidenominational idexing mechanism including in each denomination a set of stop pins individually settable for representing a digit, an input mechanism for said indexing mechanism comprising first slides for setting the stop pins of a single denomination, a set of numeral keys for individually actuating said first slides, a plurality of code bars, means for variably setting said code bars according to a digit, spring actuated second slides for sensing said code bars and selectively actuating said first slides for setting the stop pins of said single denomination, a universal bar for preventing said second slides from actuation, and cyclically operating means for causing said universal bar to release said second slides.

References Cited in the file of this patent

UNITED STATES PATENTS

| | | |
|---|---|---|
| 1,808,432 | Peirce | June 2, 1931 |
| 2,082,155 | Errera | June 1, 1937 |
| 2,185,260 | Lasker | Jan. 2, 1940 |
| 2,535,178 | Walker | Dec. 26, 1950 |
| 2,545,636 | Sundstrand | Mar. 20, 1951 |
| 2,741,427 | Drake | Apr. 10, 1956 |
| 2,767,907 | Schwend | Oct. 23, 1956 |